3,819,720
SUBSTITUTED TETRAMETHOXY DERIVATIVES
Jonathan M. Kliegman, Charleston, W. Va., assignor to Union Carbide Corporation, New York, N.Y.
No Drawing. Filed Aug. 16, 1972, Ser. No. 281,160
Int. Cl. C07c 43/30
U.S. Cl. 260—615 A       1 Claim

ABSTRACT OF THE DISCLOSURE

Novel compounds represented by the formula:

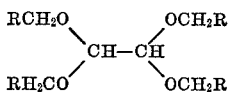

wherein R is

, $-CH_2OCH_2CH=CH_2$, and $-CH=CH(CH_2)_3CH=CH_2$ and wherein all of the R substituents in the molecule are the same. The compounds have utility as reactive solvents in coating formulations.

---

The present invention relates to substituted tetramethoxy derivatives and more particularly to novel compounds prepared from the reaction of a suitable alcohol with glyoxal. The compounds have utility as reactive air-dry solvents for coatings.

The novel compounds can be represented by the following formula:

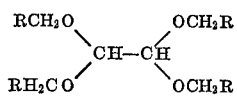

wherein R is

, $-CH_2OCH_2CH=CH_2$, and $-CH=CH(CH_2)_3CH=CH_2$ and wherein all of the R substituents in the molecule are the same.

The compounds of this invention that are within the scope of the above formula are 1,1,2,2,-tetrakis-(2',7'-octadien-1'-yloxy)ethane; 1,1,2,2 - tetrakis-(5'-norbornen-2'-methyloxy)ethane and 1,1,2,2-tetrakis-(β-allyloxyethyloxy)ethane.

The process for obtaining these novel compounds is well known and simply comprises putting the reactants, i.e., the suitable alcohol and glyoxal in contact with each other in the presence of a catalytic amount of a catalyst such as mineral acid or p-toluene sulfonic acid. The reaction medium is then heated to reflux, while azeotropically removing the water formed during the reaction. Benzene or hexane can be used as azeotroping agents. The product can be taken either as stripped or as a crude product neutralized with a base such as sodium bicarbonate.

In the case of product resulting from the reaction of four moles of norbornene methanol with one mole of glyoxal, the product obtained is 1,1,2,2-tetrakis-(5'-norbornen - 2 - methyloxy)ethane. This new compound is a liquid having a molecular weight of 505.

In the case of the product resulting from the reaction of four moles of 2,7-octadienol with one mole of glyoxal, the product obtained is 1,1,2,2-tetrakis-(2',7'-octadien-1'-yloxy)ethane. This new compound is a liquid with a molecular weight of 515. In the case of the product resulting from reaction of four moles of β-allyloxyethyl alcohol with one mole of glyoxal, the product obtained is 1,1,2,2-tetrakis-(β-allyloxyethyloxy)ethane. This new compound is a liquid having a molecular weight of 400.

The three following examples are given merely by way of illustration and relate to the preparation of the three compounds defined hereabove.

EXAMPLE I

A mixture of 408.0 grams of β-allyloxyethyl alcohol (4.0 mole), 145.0 grams 40 percent aqueous glyoxal (1.0 mole), 3.0 grams p-tolunesulfonic acid, and 1000 grams benzene were charged to a reaction flask equipped with a stirrer, and water azeotroping distillation head. The mixture was brought to reflux and water removed azeotropically from the reaction mixture. When the removal of water (both from the original aqueous glyoxal and from the reaction) was complete, the reaction mixture was neutralized with sodium bicarbonate, filtered to remove inorganic salts and subjected to vacuum stripping to remove benzene and unreacted β-allyloxyethyl alcohol. The crude product (400.0 grams, $N_D^{25}$ 1.4611, 93 percent yield) was identified from its infrared spectrum (C=C) and molecular weight (400, cryoscopic in benzene). The product was identified as 1,1,2,2-tetrakis - (β - allyloxyethyloxy) ethane.

EXAMPLE II

A mixture of 504.0 grams norbornene methanol (4.0 mole), 145.0 grams 40 percent glyoxal (1.0 mole), 0.1 p-toluenesulfonic acid, and one liter benzene were heated at reflux and water removed azeotropically. When no more water from the aqueous glyoxal or from the reaction was forthcoming, the mixture was neutralized with sodium carbonate, washed with water, taken up in ether, dried (sodium sulfate) and stripped at reduced pressure. The resulting crude product decomposed upon attempted distillation and was therefore used as the crude. This material had 85 percent of the theoretical unsaturation (by hydrogenation), a molecular weight of 505 (cryoscopic in benzene) and contained no free glyoxal. The yield was 473.0 grams (90 percent). The product was identified as 1,1,2,2-tetrakis-(5'-norbornen-2'-methyloxy)ethane.

EXAMPLE III

This example was carried out in a manner similar to Example II. A mixture of 504.0 grams octadienol (4.0 mole), 45.0 grams 40 percent aqueous glyoxal (1.0 mole), 0.1 grams p-toluenesulfonic acid, and one liter benzene were heated at reflux until all water had been removed. The resulting residue product (after treatment as described in Example II) contained conjugated double bonds and no hydroxy or carbonyl groups (infrared), took up 85 percent of the theoretical hydrogen and had a molecular weight of 515 (cryoscopic in benzene). The yield was 485.6 grams (92 percent). The product was identified as 1,1,2,2 - tetrakis(2',7' - octadien-1'-yloxy) ethane.

As indicated previously, the novel compounds are useful in coatings compositions wherein the novel compounds or mixtures thereof have replaced some or all of the solvent in a coatings composition that cures by polymerization of olefinic unsaturation. Such coatings compositions that are useful in this aspect of the invention include the paints, varnishes, and the like that are prepared from drying oils and/or drying oil derivatives such as alkyd resins, novolac-drying oil reaction products of drying oil acids and epoxy resins, unsaturated polyester resins, and the like. All of such coatings compositions contain solvents such as mineral spirits, naphtha, aromatic hydrocarbons, turpentine, ketones, and the like. The solvents are normally evaporated into the atmosphere after the coating has been applied. This not only constitutes an economic loss, but also contributes to air pollution. It is an object of the invention to replace some or all of the solvent in such coatings compositions with the relatively non-volatile, normally liquid novel compounds. These compounds copolymerize with the olefinic unsaturation, such as that found in a drying oil or drying oil derivative or in an unsaturated polyester, in the polymerization step, and thus can be viewed as being reactive solvents.

The novel compounds of the present invention, or mixtures of these compounds provide a unique combination of desirable properties for a reactive solvent. They exhibit excellent solvating properties, are nonvolatile and result in hard surfaces with good adhesion and acceptable flexibility without deterioration of chemical resistance. In addition, the drying times are often reduced using the present compounds as reactive solvents, and the problems attending solvents loss are minimized.

Thus, in another aspect, the present invention relates to the utilization of the novel compounds as reactive solvents by incorporation of these reactive solvents into coating compositions which are capable of undergoing cure by contact with atmospheric oxygen either at ambient or elevated temperatures.

The preferred curable compositions provided by this invention are those comprising oil-modified alkyd resins having a viscosity of 1000 to 10,000 centipoises at a temperature of 25° C. and a compound of the formula:

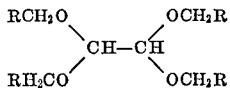

wherein R is

, $-CH_2OCH_2CH=CH_2$, and $-CH=CH(CH_2)_3CH=CH_2$ and wherein all of the R substituents in the molecule are the same.

The reactive diluent 1,1,2,2-tetrakis-(2',7'-octadien-1'-yloxy)ethane; 1,1,2,2 - tetrakis-(5'-norbornen-2'-methyoxy)ethane and 1,1,2,2-tetrakis-(β-allyloxyethyloxy)ethane in a quantity between about 20 and 75 percent, based on the weight of the alkyd resin is generally effective in producing the desired reduction in viscosity of the resin while at the same time allowing the retention of the desirable characteristics in the final cured polymer.

The alkyd resins can be conveniently prepared from well known conventional procedures, such as, for example, by reacting two moles of either a soya or linseed oil with one mole of a polyol such as glycerine in the presence of an acid catalyst at 200–210° C. This gives a mixture of mono and diglycerides. Addition of one mole of phthalic anhydride and continued heating results in the alkyd resin in 2–10 hours. The relative amounts of soya oil or linseed oil, polyol, and phthalic anhydride depend on the desired properties of the alkyd resin.

The curable compositions of this invention can be prepared by simply mixing together the resin and reactive diluent at room temperature.

The curing reaction can be accomplished at temperatures from about 50° C. to 200° C., with the preferred temperature range being between about 70° C. and 120° C. The curing time required can vary from a few minutes to seventy-two hours depending upon the curing temperature. Thus, at 50° C. as long as seventy-two hours may be required for a proper cure, while at 150° C. as little as ten minutes may be sufficient. At 70° C. the usual curing time is sixteen hours, while at 100° C. from three to eight hours is required.

The following examples will serve to illustrate the use of the reactive solvents in coating compositions.

EXAMPLE IV

To a solution of 234.1 grams of a medium linseed oil alkyd resin in 234.1 grams of mineral spirits was added 100.0 grams of 1,1,2,2-tetrakis-(5'-norbornen-2'-methyloxy)ethane as reactive solvent. To this mixture was added 0.17 grams of cobalt drier (cobalt octanoate) and 0.17 grams of acetone oxime. The blended formulation comprised by weight, 41.2 percent alkyd resin, 41.2 percent mineral spirits, 17.6 percent reactive solvent, 0.03 percent cobalt and 0.03 percent acetone oxime.

The blended formulation was stored in a well stoppered brown glass bottle and aged for at least 24 hours prior to application. The viscosity of the aged formulation was 680 cps. and was determined using a Brookfield Viscometer at 24° C.

A 2.5 mil film of this solution was cast on a Bonderite No. 37 steel panel which was scrubbed with acetone soaked lint-free paper and allowed to air-dry immediately prior to application. The coating formulation was cast with a draw-down blade set to give a dry film of 2.5 mil thickness. Dry time was determined manually. The times when the coating was considered to be tack-free and print-free were recorded. The appearance of the cured film was recorded after three days.

After two weeks of air-drying at room temperature and ambient relative humidity, the panel was extracted to determine the extent of soluble components in the coating. The extraction was carried out in the following manner. Thin weighed strips of the film were immersed in acetone and heated at 60° C. for 4 days. The solvent was then replaced with fresh acetone and the extraction was repeated for 2 days at 60° C. The film strips were then dried and the residual weight was compared with the initial weight to determine the percentage of insoluble resin.

The coating was cured for a total of four weeks under prevailing laboratory conditions of temperature and relative humidity. Weight changes and physical and chemical properties of the cured coatings were then measured and recorded. The test panel was then heated at 140° F. for 12 days and examined for further weight changes and physical and chemical properties.

The results of the above are that the film was dry to the touch in 5 hours and print free in 7 hours. The cured film had a sward hardness of 20 after air-drying for four weeks and then baking at 140° F. for 12 days. It could withstand a reverse impact in excess of 165 inch pounds without cracking. The film also displayed excellent adhesion and the film had a smooth appearance. Exposure to 1 percent sulfuric acid for four hours had little effect on the film. Exposure to 2 percent sodium hydroxide for four hours dissolved the film.

EXAMPLE V

The procedure of Example IV was repeated except that 100.0 grams of 1,1,2,2-tetrakis-(2',7'-octadien-1'-yloxy) ethane was employed as reactive solvent.

The results are indicated in Table I below:

TABLE I

| | |
|---|---|
| Viscosity cps. at 24° C. | 450. |
| Drying time, hrs.: | |
| Tack-free | 4.5. |
| Print-free | 7.5. |
| Dry film thickness, mils | 2.5. |
| Appearance of cured film | Smooth. |
| Percent insoluble resin after air dry for 2 weeks | 64.6. |
| Sward hardness | 26. |
| Reverse impact | 20. |
| Adhesion | Excellent. |
| 1% H₂SO₄ (4 hrs.) | Do. |
| 2% NaOH (4 hrs.) | Poor. |

EXAMPLE VI

To a solution of 234.1 grams of a medium soya oil alkyd resin in 234.1 grams of mineral spirits was added 100.0 grams of 1,1,2,2-tetrakis-(5'-norbornen-2'-methyloxy)ethane as reactive solvent. To this mixture was added 0.17 grams of cobalt drier (cobalt naphthoate) and 0.17 grams of acetone oxime. The blended formulation comprised by weight, 41.2 percent alkyd resin, 41.2 percent mineral spirits, 17.6 percent reactive solvent, 0.03 percent cobalt and 0.03 percent acetone oxime.

The blended forumlation was stored in a well stoppered brown glass bottle and aged for at least 24 hours prior to application. The viscosity of the aged formulation was 720 cps. and was determined using a Brookfield Viscometer at 24° C.

A 3.0 mil film of this solution was cast on a Bonderite No. 37 steel panel which was scrubbed with acetone soaked lint-free paper and allowed to air-dry immediately prior to application. The coating formulation was cast with a draw-down blade set to give a dry film of 3.0 mil thickness. Dry time was determined manually. The time when the coating was considered to be tack-free and print-free was recorded. The appearance of the cured film was recorded after three days.

After two weeks of air-drying at room temperature and ambient relative humidity, the panel was extracted to determine the extent of soluble components in the coating. The extraction was carried out in the following manner. Thin weighed strips of the film were immersed in acetone and heated at 60° C. for 4 days. The solvent was then replaced with fresh acetone and the extraction was repeated for 2 days at 60° C. The film strips were then dried and the residual weight was compared with the initial weight to determine the percentage of insoluble resin.

The coating was cured for a total of four weeks under prevailing laboratory conditions of temperature and relative humidity. Weight changes and physical and chemical properties of the cured coating were then measured and recorded. The test panel was then heated at 140° F. for 12 days and examined for further weight changes and physical and chemical properties.

The results of the above are that the film was dry to the touch in 6 hours and print-free in 9 hours. The cured film had a Sward hardness of 14 after air-drying for four weeks and then baking at 140° F. for 12 days. It could withstand a reverse impact on 65 inch pounds without cracking. The film also displayed excellent adhesion and the film had a smooth appearance. Exposure to 1 percent sulfuric acid for four hours had little effect on the film. Exposure to 2 percent sodium hydroxide for four hours dissolved the film.

EXAMPLE VII

The procedure of Example V was repeated except that 100.0 grams of 1,1,2,2-tetrakis-(2',7'-octadien-1'-yloxy)ethane was employed as reactive solvent.

The resultant formulation consisted of 41.2 percent alkyd resin, 41.2 percent mineral spirits, 17.6 percent reactive solvent and contained 0.03 percent cobalt drier (cobalt octanoate) and 0.03 acetone oxime.

The results are indicated in Table II below:

TABLE II

| | |
|---|---|
| Viscosity cps. at 24° C. | 450. |
| Drying time, hrs.: | |
| Tack-free | 5.5. |
| Print-free | 7.5. |
| Dry film thickness, mils | 2.75. |
| Appearance of cured film | Smooth. |
| Percent insoluble after air dry for 2 weeks | 66.9. |
| Sward hardness | 22. |
| Reverse impact | <5. |
| Adhesion | Poor. |
| 1% $H_2SO_4$ (4 hrs.) | Excellent. |
| 2% NaOH (4 hrs.) | Poor |

I claim:
1. 1,1,2,2-tetrakis-(2',7'-octadien-1'-yloxy)ethane.

References Cited

UNITED STATES PATENTS

| | | | |
|---|---|---|---|
| 3,197,447 | 7/1965 | Talet | 260—615 R |
| 2,425,042 | 8/1947 | McNamee et al. | 260—615 A |
| 2,321,094 | 6/1943 | McDowell et al. | 260—615 A |
| 2,360,959 | 10/1944 | McDowell et al. | 260—615 A |
| 2,194,405 | 3/1940 | Purves | 260—615 A |

FOREIGN PATENTS

| | | | |
|---|---|---|---|
| 559,362 | 2/1944 | Great Britain | 260—615 A |

HOWARD T. MARS, Primary Examiner

U.S. Cl. X.R.

106—243; 117—118, 130 R, 132 R, 111 K; 260—19 UA, 22 CB, 611 R